(12) United States Patent
Baldiga et al.

(10) Patent No.: US 9,745,854 B2
(45) Date of Patent: Aug. 29, 2017

(54) SHROUD ASSEMBLY AND SEAL FOR A GAS TURBINE ENGINE

(71) Applicant: GENERAL ELECTRIC COMPANY, Schenectady, NY (US)

(72) Inventors: Jonathan David Baldiga, Salem, MA (US); Meghan Mary Lenihan, Salem, MA (US); Jason David Shapiro, Methuen, MA (US)

(73) Assignee: General Electric Company, Schenectady, NY (US)

( * ) Notice: Subject to any disclaimer, the term of this patent is extended or adjusted under 35 U.S.C. 154(b) by 208 days.

(21) Appl. No.: 14/396,811

(22) PCT Filed: Apr. 26, 2013

(86) PCT No.: PCT/US2013/038346
§ 371 (c)(1),
(2) Date: Oct. 24, 2014

(87) PCT Pub. No.: WO2013/163505
PCT Pub. Date: Oct. 31, 2013

(65) Prior Publication Data
US 2015/0098829 A1    Apr. 9, 2015

Related U.S. Application Data

(60) Provisional application No. 61/639,416, filed on Apr. 27, 2012.

(51) Int. Cl.
*F01D 11/00* (2006.01)
*F01D 11/08* (2006.01)
(Continued)

(52) U.S. Cl.
CPC ............ *F01D 5/225* (2013.01); *F01D 11/003* (2013.01); *F01D 11/005* (2013.01);
(Continued)

(58) Field of Classification Search
CPC ........ F01D 11/005; F01D 11/08; F01D 5/225; F01D 11/003; F01D 11/12; F01D 11/122;
(Continued)

(56) References Cited

U.S. PATENT DOCUMENTS 5,188,506 A    2/1993    Creevy et al.
5,301,595 A    4/1994    Kessie
(Continued)

FOREIGN PATENT DOCUMENTS

CN    1811135 A    8/2006
CN    101163862 A    4/2008
(Continued)

OTHER PUBLICATIONS

International Search Report dated Aug. 16, 2013 which was issued in connection with PCT Patent Application No. PCT/US2013/038346 which was filed on Apr. 26, 2013.
(Continued)

*Primary Examiner* — Christopher Verdier
(74) *Attorney, Agent, or Firm* — General Electric Company; William Scott Andes

(57) ABSTRACT

A shroud assembly having rope seals disposed between the shroud hangers and the surrounding case structure.

7 Claims, 1 Drawing Sheet

(51) Int. Cl.
  *F01D 5/22* (2006.01)
  *F01D 25/24* (2006.01)
  *F02C 7/28* (2006.01)

(52) U.S. Cl.
  CPC .............. *F01D 25/246* (2013.01); *F02C 7/28* (2013.01); *F01D 11/08* (2013.01); *F05D 2240/11* (2013.01)

(58) Field of Classification Search
  CPC ...... F01D 25/246; F02C 7/28; F05D 2240/11; F05B 2240/11
  USPC ....... 415/135, 138, 139, 173.1, 173.3, 214.1
  See application file for complete search history.

(56) References Cited

U.S. PATENT DOCUMENTS

| | | | |
|---|---|---|---|
| 6,575,697 | B1 | 6/2003 | Arilla et al. |
| 6,666,645 | B1 | 12/2003 | Arilla et al. |
| 7,008,183 | B2 * | 3/2006 | Sayegh ................... F01D 9/04 415/115 |
| 7,246,996 | B2 | 7/2007 | Harris |
| 8,021,120 | B2 | 9/2011 | Schrey et al. |
| 8,047,773 | B2 | 11/2011 | Bruce et al. |
| 2003/0123978 | A1 | 7/2003 | Aksit et al. |
| 2004/0141838 | A1 * | 7/2004 | Thompson ............. F01D 11/08 415/209.3 |
| 2005/0129499 | A1 | 6/2005 | Morris et al. |

FOREIGN PATENT DOCUMENTS

| | | |
|---|---|---|
| CN | 101372902 A | 2/2009 |
| FR | 2955898 A1 | 8/2011 |
| JP | 2003514182 A | 4/2003 |
| JP | 2003519742 A | 6/2003 |
| JP | 2003227356 A | 8/2003 |

OTHER PUBLICATIONS

Unofficial English Translation of Japanese Office Action issued in connection with corresponding JP Application No. 2015509168 Oct. 27, 2015.

Unofficial English Translation of Chinese Office Action issued in connection with corresponding CN Application No. 201380022344.6 on Jun. 30, 2015.

Unofficial English Translation of Japanese Office Action issued in connection with corresponding JP Application No. 2015509168 on Aug. 9, 2016.

* cited by examiner

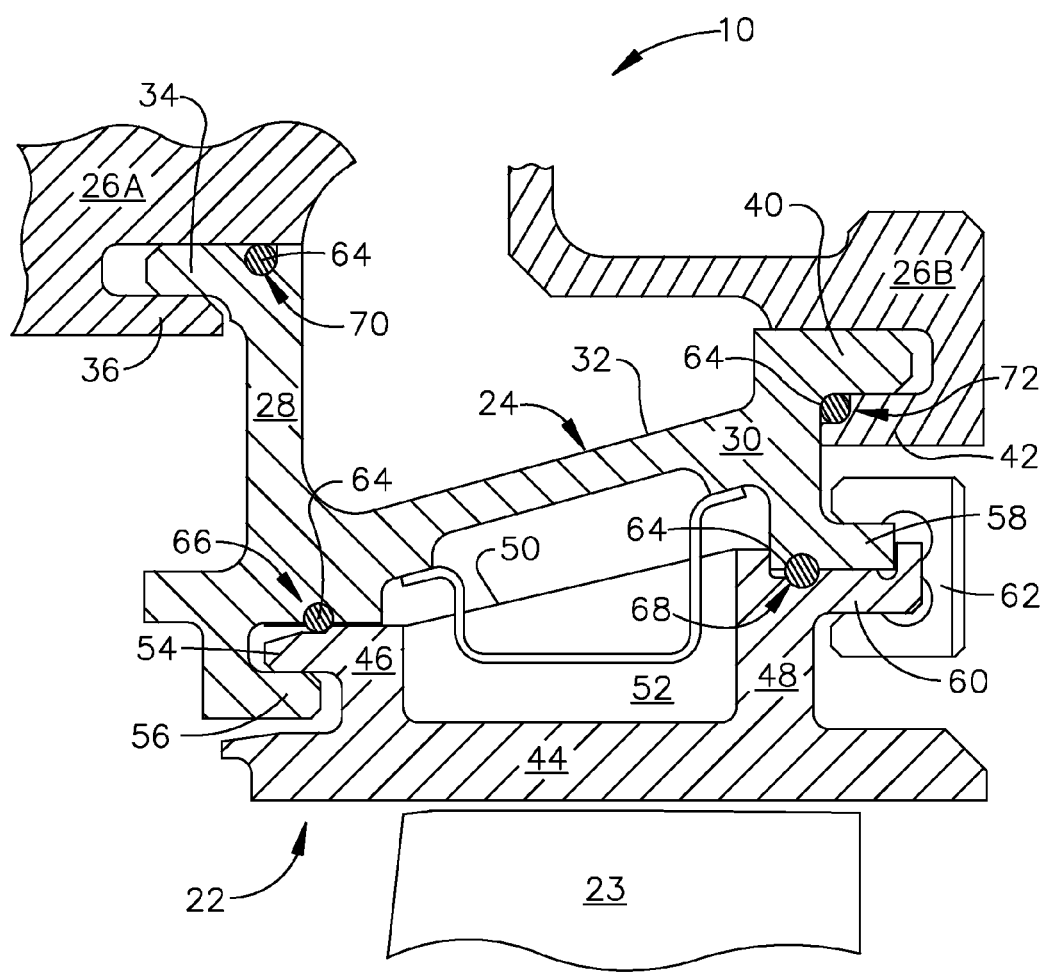

SHROUD ASSEMBLY AND SEAL FOR A GAS TURBINE ENGINE

BACKGROUND OF THE INVENTION

The present invention relates to shroud assemblies used in gas turbine engines, and more particularly to a seal for filling a cavity formed between a turbine nozzle hanger and a surrounding frame.

In a gas turbine engine, hot gas exits a combustor and is utilized by a turbine for conversion to mechanical energy. This mechanical energy drives an upstream high pressure compressor. The turbine comprises a plurality of blades which are carried by a turbine rotor. The tips of the rotor blades are tightly circumscribed by a plurality of shroud segments. The shrouds are supported by a plurality of shroud supports or "hangers" which are located radially outward from the shrouds. The shrouds and hangers must be segmented circumferentially to accommodate differential thermal expansion rates and to maintain blade tip clearance control.

Each shroud connects to a hanger in such a manner that a plenum region is defined therebetween. In operation this plenum region receives a flow of coolant, such as air extracted (bled) from the compressor. Any leakage of cooling air between the numerous components of the shroud assembly increases the total amount of bleed air required, reducing engine efficiency.

Accordingly, there is a need for a shroud assembly with improved sealing.

BRIEF DESCRIPTION OF THE INVENTION

In one aspect, a shroud assembly having rope seals disposed between the shroud hangers and the surrounding case structure.

BRIEF DESCRIPTION OF THE DRAWINGS

The technology described herein may be best understood by reference to the following description taken in conjunction with the accompanying drawing FIGURE, which is a schematic cross-sectional view of a portion of a turbine section of a gas turbine engine, incorporating an exemplary shroud assembly.

DETAILED DESCRIPTION OF THE INVENTION

Referring to the single FIGURE wherein identical reference numerals denote the same elements throughout the various views, an exemplary shroud assembly 10 is part of a high pressure turbine, which is in turn part of a gas turbine engine of a known type. The principles described herein are equally applicable to turboprop, turbojet, turbofan, and turboshaft engines, as well as turbine engines used for other vehicles or in stationary applications.

The shroud assembly 10 includes a shroud in the form of an annular array of arcuate shroud segments 22 surrounding turbine blades 23. The shroud segments 22 are held in position by an annular array of arcuate shroud hangers 24. The hangers 24 are supported in turn by one or more stationary case components, indicated at 26A and 26B. More specifically, each hanger 24 includes a forward or upstream rail 28 and an aft or downstream rail 30 integrally interconnected by a body panel 32. The forward rail 28 is provided with a forward outer flange 34 which radially overlaps a forward hook 36 of the outer case 26A. Similarly, the aft rail 30 is provided with an aft outer flange 40 in radially overlapping relation with an aft hook 42 of the outer case 26B.

Each shroud segment 22 includes a base 44 having radially outwardly extending forward and aft walls 46 and 48, respectively. These walls 46 and 48 are joined by radially outwardly extending, spaced-apart walls 50, to define a shroud cavity 52. The forward wall 46 includes a forward shroud flange 54 which overlaps a forward inner flange 56 extending from the forward rail 28 at a location radially inward from the forward outer flange 34. An aft inner flange 58 extends rearwardly from hanger aft rail 30 at a location radially inward from the aft outer flange 40 and is held in overlapping relation with an aft shroud flange 60 rearwardly from shroud section aft wall 48 by a generally arcuate retainer 62 of C-shaped cross section, commonly referred to as a C-clip. This retainer may 62 take the form of a single ring with a gap for thermal expansion or may comprise multiple arcuate retainers.

The shroud assembly 10 includes several rope seals 64. Each rope seal 64 is retained in a cavity formed between adjacent static components. A first cavity 66 is formed between the forward shroud flange 54 and the forward inner flange 56, and receives a rope seal 64. A second cavity 68 is formed between the aft inner flange 58 of the hanger 24 and the aft shroud flange 60, and receives a rope seal 64.

In contrast to prior art practice, the shroud assembly 64 also includes rope seals 64 between the hanger 24 and the stationary case components 26A and 26B. More specifically, a third cavity 70 is formed between the forward rail 28 of the hanger 24 and the case 26A, and receives a rope seal 64. A fourth cavity 72 is formed between the aft outer flange 40 of the hanger 24 and the aft hook 42 of the outer case 26B, and receives a rope seal 64.

As used herein, the term "formed between" in reference to each of the cavities 66, 68, 70, and 72 refers to the presence of a volume sized and shaped to accept the rope seal 64. The cavity may take the form of a recess or groove formed wholly in one of the two mating components, or partially in each of the two mating components.

The rope seals 64 are constructed in accordance with prior art practice. Each rope seal 64 is of generally circular cross-sectional shape and may be made of a material such as stainless steel braid, or INCONEL alloy braid filled with silica. The material is provided in continuous lengths which are cut to size, and formed into a circle, and placed into the cavities 66, 68, 70, 72, with the ends butted together.

The relative size and shapes of the cavities 66, 68, 70, 72 and the rope seals 64 are selected such that when each rope seal is installed in its respective cavity and the mating parts assembled, the rope seal 64 will be partially crushed in order to ensure continuous metal-to-metal contact. Additionally, each rope seal 64 spans a full 360 degree arc, cutting down on split-line leakage paths.

In operation, the rope seals 64 are effective to reduce or eliminate leakage between the various components of the shroud assembly 10. It should be noted that the exact locations of the rope seals 64 are merely for illustration and may be varied to suit a particular application. Furthermore, specific applications may use a smaller or larger number of rope seals.

The foregoing has described a turbine shroud apparatus for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A shroud assembly for a gas turbine engine, said shroud assembly comprising:
   an annular array of arcuate shroud segments;
   a plurality of stationary case components surrounding said shroud segments;
   a plurality of arcuate shroud hangars located between said shroud segments and said stationary case components and supporting said shroud segments; and
   at least four rope seals, wherein one rope seal is disposed between a forward flange of said shroud segments and a forward inner flange of said shroud hangars, one rope seal is disposed between an aft flange of said shroud segments and an aft inner flange of said shroud hangars, one rope seal is disposed between a forward rail of said shroud hangars and said stationary case components, and one rope seal is disposed between an aft outer flange of said shroud hangars and an aft hook of said stationary case components.

2. A shroud assembly in accordance with claim 1, wherein said rope seals are formed from a material selected from the group consisting of stainless steel braid, INCONEL alloy braid filled with silica, and combinations thereof.

3. A shroud assembly in accordance with claim 1, wherein said rope seals are retained in a cavity formed between said shroud hangars and said stationary case components.

4. A shroud assembly in accordance with claim 1, wherein said rope seals have a generally circular cross-sectional shape.

5. A shroud assembly in accordance with claim 1, wherein said rope seals are partially crushed between said shroud hangars and said stationary case components.

6. A shroud assembly in accordance with claim 1, wherein said rope seals span a full 360 degree arc.

7. A shroud assembly in accordance with claim 1, wherein said rope seals are retained in a cavity formed between opposing flanges of said shroud hangars and said stationary case components.

* * * * *